United States Patent [19]

Paulen

[11] 4,131,634
[45] Dec. 26, 1978

[54] PROCESS FOR THE PREPARATION OF TACKY MIXTURES BASED ON RUBBERY ETHENE COPOLYMERS

[75] Inventor: Hendrikus J. G. Paulen, Roosteren, Netherlands

[73] Assignee: Stamicarbon, B.V., Geleen, Netherlands

[21] Appl. No.: 678,877

[22] Filed: Apr. 21, 1976

[30] Foreign Application Priority Data

Apr. 24, 1975 [NL] Netherlands .......................... 7504834

[51] Int. Cl.$^2$ .......................... C08L 9/00; C08L 9/06; C08L 19/00
[52] U.S. Cl. .............................. 260/845; 260/23.7 M; 260/846; 260/876 B; 260/889
[58] Field of Search ............ 260/889, 845, 846, 876 B

[56] References Cited

U.S. PATENT DOCUMENTS

| | | | |
|---|---|---|---|
| 3,343,582 | 9/1967 | Himes et al. .......................... | 260/889 |
| 3,451,962 | 6/1969 | Auler et al. .......................... | 260/889 |
| 3,557,028 | 1/1971 | Turk .................................... | 260/889 |
| 3,630,974 | 12/1971 | Ladocsi et al. ...................... | 260/889 |
| 3,741,931 | 6/1973 | Martin et al. ........................ | 260/889 |
| 3,821,152 | 6/1974 | Cornell et al. ...................... | 260/889 |
| 3,852,354 | 12/1974 | Usamoto et al. .................... | 260/889 |

*Primary Examiner*—John C. Bleutge
*Attorney, Agent, or Firm*—Cushman, Darby & Cushman

[57] ABSTRACT

Rubber mixtures consisting of (1) 20 - 75 parts of a copolymer containing 60 - 80% by weight of ethylene, 20 - 40% by weight of an α-alkene, and 0 - 20% by weight of one or more polyenes and having, in the unvulcanized state, an elongation at rupture of over 800% and a tensile strength of between 10 and 100 kg/cm$^2$; (2) 80 - 25 parts of at least one polymeric material which is a styrene-butadiene copolymer; polybutadiene or polyisoprene; and (3) a tackifier resin and optionally conventional fillers and additives, wherein the mixture of (1), (2) and (3) has an elongation at rupture of at least 800% and a tensile strength of between 1.3 and 50 kg/cm$^2$.

11 Claims, No Drawings

PROCESS FOR THE PREPARATION OF TACKY MIXTURES BASED ON RUBBERY ETHENE COPOLYMERS

BACKGROUND OF THE INVENTION

The invention is directed to mixtures based on rubbery copolymers of ethylene, at least one other α-alkene, and, optionally one or more polyenes, characterized by good tack values and the process for preparing those mixtures.

Copolymers of ethylene with at least another α-alkene or ethylene copolymers containing a second α-alkene are popular synthetic rubbery polymers because of their excellent resistance to ozonization, weathering and aging. The resistance of these polymers to ozone, weathering and aging render these polymers attractive for various purposes.

However, conventional ethylene-α-alkene and ethylene-α-alkene-polyene elastomers, just as styrene-butadiene copolymers for example, are deficient with respect to tack properties and properties of adhesion.

Tack and adhesion, as referred to herein, connote the adhesion of unvulcanized rubber to itself, that is, connote the adhesion of two surfaces of two strips of unvulcanized rubber of identical composition when those two pieces are contacted with each other under moderate pressure.

Good tack properties of elastomers are essential, in the manufacture of various articles, and in particular multipartite or multilayered articles, such as, for instance, driving belts, conveyor belts, and, more in particular, car tires. Adequate tack properties will result in thorough adhesion of the various parts or layers of an article, each of which parts or layers are formed of the same rubber, during assembly and vulcanization.

The prior art has examined various alternatives for overcoming the inadequate tack properties of rubber copolymers based on ethylene-α-alkene and ethylene-α-alkene-polyene copolymers: for instance, one art recognized method includes the concept of adhering separate rubber surfaces to sandwich structures by means of adhesives applied in layers. Not only are such processes cumbersome, and hence unattractive for industrial purposes, but also such processes involve a certain amount of danger: inflammable organic solvents are often used in formulation and application of adhesives in those processes, so that those processes are not recommended, if only for the dangers inherent therein when undertaken on industrial scale.

In addition, the prior art has developed tackifier resins, e.g., condensation products of phenols and aldehydes and condensation products of acetylene, alkylated phenol resins including those sold under the trade name AMBEROL ST 140 F, phenol-substituted isoprene resins and phenol-substituted isoprene-isocopolymer resins. Use of tackifying resins provides the advantage that tackifying resins can be admixed with rubber to provide specific formulations and need not be applied to rubber surfaces in layers. Practically, it has been discovered that the actual amounts of tackifier resins necessary to provide reasonable tack levels in the rubbers admixed therewith impair other properties of the vulcanized rubber product. Moreover, the necessity of large amounts of tackifier resins results in migration of tackifier resins to the rubber surface in a phenomenon referred to as exudation. The manifestation of exudation is manifestly aggravated when rubber ethylene copolymers are rolled or calendered, since the exudation may result in complete negation of the effect desired by the inclusion of the aforementioned types of tackifiers and actually produce adverse effects. Furthermore, the use of large quantities of tackifiers is very expensive. Although tackifiers may be used in smaller amounts in which the adverse effects are obviated, the use of small amounts has failed to result in rubber formulations of satisfactory adhesion and tack.

United States patent application, Ser. No. 517,052, filed Oct. 22, 1974 is directed to a process for preparing rubbery copolymers based on polyethylene, of improved tack properties, in which the rubbery ethylene copolymer is formed of ethylene, at least one other α-alkene, one or more polyenes, in combination with one or more tackifying resins, in which is employed a copolymer of ethylene which contains carbon-carbon double bonds in the non-linear part of the polymer chain, the carbon atoms of which have either two vicinal hydrocarbon groups in a cis position with respect to each other but which do not form a cyclic system or have at least three hydrocarbon substituents; exposing a mixture of the copolymer, a tackifying resin and any optional conventional additives, in the presence of oxygen and photosensitizers, to an artificial light source emitting light at a wave length of 200–800 nanometers, the mixture of the copolymer, tackifying resin and optional conventional additives has an elongation at rupture of at least 500% and a tensile strength of between 1.5 and 50 kg/cm$^2$ in the unvulcanized state.

Preferably in the said process the rubbery copolymer has a thermogram recorded at a cooling rate of 8° C. per minute, showing a heat of crystallization as a function of the temperature having a peak at a temperature between −7° C. and 11° C.

SUMMARY OF THE INVENTION

The invention is directed to the production of ethylene copolymers which are characterized by satisfactory tack values by virtue of the nature of the composition of the ethylene copolymer composition. That is, ethylene copolymer compositions of the invention are characterized by satisfactory tack values and are produced in a process which does not require exposing those ethylene copolymers or the compositions containing those ethylene-copolymers to light. In particular, the composition of the invention is directed to a mixture of an ethylene copolymer with a copolymer based on a conjugated diene polymer. In particular, the ethylene copolymer is comprised of ethylene, an α-alkene, and optionally a polyene. The polymer based on conjugated diene is selected from the group consisting of styrene-butadiene copolymers, polybutadiene and polyisoprene. The mixture of the ethylene copolymer and the polymer based on a conjugated diene polymer, in accordance with the invention, has an elongation at rupture of at least 800% and a tensile strength of between 1.3 and 50 kg/cm$^2$. It is clear, that by virtue of the invention, it is possible to form mixtures of an ethylene copolymer and a polymer based on a conjugated diene, each of which components lack satisfactory tack properties individually, but in combination produce a mixture which is characterized by satisfactory tack values.

DETAILED DESCRIPTION OF THE INVENTION

The compositions of the invention are rubbery ethylene copolymers which are characterized by satisfactory tack values. By virtue of the invention, ethylene copolymer compositions, elastomeric in nature, can be produced which are characterized by satisfactory tack values even without substantially exposing the mixture of the two components to light at wave length of 200–800 nm. Normal available light is of course not necessarily excluded. That means that there is no need to have a light intensity of more than $200\mu$ W/cm$^2$ nm direct sunlight or more than $30\mu$ W/cm$^2$ nm (indirect sunlight). There is even no need for normal room light which has in general an intensity lower than $2\mu$ W cm$^2$/nm.

The composition itself is formed of (I) 20–75 parts of a rubbery copolymer containing 60–80% by weight of ethylene, 20–40% by weight of an α-alkene, and 0–20% by weight of one or more polyenes and having in the unvulcanized state an elongation at rupture of over 800% and a tensile strength of between 10 and 100 kg/cm$^2$; (II) 80–25 parts of one or more rubbery polymers composed of a conjugated diene selected from the group consisting of styrene-butadiene copolymers, polybutadiene and polyisoprene; (III) a tackifier resin and conventional fillers and additives, said mixture having an elongation at rupture of at least 800% and a tensile strength of 1.3 and 50 kg/cm$^2$.

The ethylene copolymers, which are employed in the mixture of the invention, are based on ethylene, at least one α-alkene, and optionally, one or more polyenes. The α-alkene which is used in the ethylene copolymer may be any copolymerizable α-alkene; α-alkenes having 3–18 carbon atoms per molecule, and preferably α-alkenes with 3–4 carbon atoms per molecule, may be employed. Examples of suitable α-alkenes are those including butene, 4-methylpentene-1, hexene, heptene, and preferably propylene. Mixtures of α-alkenes may be incorporated into the ethylene copolymers used in accordance with the invention, e.g., propylene and butene. The ethylene content of the ethylene copolymers ranges between 60–80% by weight.

The ethylene copolymers with highest tack values will usually be found to contain an ethylene content of below 75% by weight.

In addition to the α-alkene, the ethylene copolymer may optionally contain one or more polyenes. These polyenes may be present in the copolymer in an amount of up to 20% by weight and preferably in an amount of below 10% by weight of the ethylene copolymer. These polyenes are preferably non-conjugated dienes although trienes can also be used.

In order to produce vulcanized mixtures of the invention of optimum mechanical properties, at least 2% by weight, preferably at least 4% by weight of the polyene based upon the ethylene copolymer, is employed in forming the ethylene copolymer. Examples of suitable polyenes are dicyclopentadiene, methylene norbornene, ethylidene norbornene, propenyl norbornene and 1,4-hexadiene.

The ethylene copolymers, which are used in the mixtures of the invention, can generally be prepared by interpolymerization of a mixture of ethylene, at least one other α-alkene, and, optionally, at least one polyene, by means of a coordination catalyst, in solution in an organic solvent or in suspension. The copolymerization reaction is usually undertaken at temperatures ranging between −40° and 120° C., preferably, between −20° and 80° C. The pressure of the copolymerization may range from 1 to 50 atmospheres; but the pressure of the copolymerization is not critical, and thus higher or lower pressures may be used. Preferably, the process of forming the ethylene copolymers is a continuous process. The coordination catalyst used may be a catalyst formed by combining at least one compound of a metal selected from sub-groups IV through VI and VIII of the Periodic Table, including thorium and uranium as the so-called heavy metal component, with a metal, alloy, metal hydride or metal compound of a metal selected from Groups I through III or from the fourth group of Period Table, the so-called aluminum components; optionally, other substances, such as small amounts of compounds with free electron pairs, e.g., water, alcohol, oxygen or Lewis bases, or small amounts of polyhalogenated organic compounds may be employed. Preferably, the catalyst system is formed of a combination of vanadium and/or titanium compounds that are soluble in the vehicle in which polymerization is undertaken, e.g., vanadium oxytrichloride and/or vanadium tetrachloride and/or titanium tetrachloride and/or tetraalkyltitanate, with one or more, aluminum compounds, preferably organic aluminum compounds, such as aluminum trialkyls, dialkyl aluminum halogenide and/or monoalkyl aluminum halogenides, or dialkyl aluminum monohydrides. Preferably, organic aluminum compounds, particularly alkyl aluminum compounds in which the alkyl group contains 2 to 8, and preferably 2 to 5 carbon atoms are employed. Very good results are realized when vanadium oxytrichloride and alkyl aluminum halogenides are employed as the catalyst.

The ratio between the aluminum component and the heavy-metal component may be varied within wide limits, e.g., between 2:1 and 500:1 and, preferably, between 3:1 and 25:1. If the process for forming the ethylene copolymer is a continuous process, the catalyst components may be added directly to the polymerization zone in solution in a vehicle.

The vehicle used in the copolymerization reaction may be any liquid that is inert to the catalyst used, and which, preferably, contains 4–8 carbon atoms per molecule. Exemplary of suitable hydrocarbons are aliphatic and cyclo-aliphatic hydrocarbons, such as butane, pentane, cyclohexane, hexane, heptane or petroleum fractions, aromatic hydrocarbons such as e.g., toluene and benzene, and halogenated organic hydrocarbons, such as tetrachloroethene.

The process can profitably be undertaken at temperatures and pressures such that one or more of the monomers employed to form the ethylene copolymer, particularly the α-alkene (such as propylene) is liquid and is present in such amounts as to act as the vehicle of the interpolymerization. Under these circumstances, no other vehicle is necessary.

Molecular weight of ethylene copolymers, used in accordance with the process of the invention, can be controlled by chain regulators, including, e.g., acetylene, hydrogen, butadiene-1,2, zincalkyls and alkyl halogenides. Preferably, hydrogen is used as a chain regulator. The molecular weights of these rubbery ethylene copolymers usually range from about $5 \times 10^4$ to $5 \times 10^6$. By the term "molecular weight", as used herein, is meant the weight-average molecular weight as determined by light scattering technique, after gel (if present) removal.

The second component of the mixture, particularly, the rubbery polymer based on the conjugated dienes should be selected from the group consisting of styrene-butadiene copolymer, polybutadiene and polyisoprene.

The styrene-butadiene copolymer which may be used may be produced either by emulsion polymerization or by solution polymerization. Such polymers should contain between 5-30% by weight of styrene. Either random or block copolymers of styrene and butadiene may be used in accordance with the invention. The processes for the preparation of these copolymers are well known in the art.

The polybutadiene which may be used as the second component of the mixtures of the invention may be prepared by solution polymerization, either in the presence of a Ziegler catalyst or in the presence of organolithium catalysts. Preferably the polybutadienes have a cis content of at least 30%.

Polyisoprene, used as the second component of the mixture of the invention, may also be prepared by means of a Ziegler catalyst or by means of an organolithium catalyst. Preferably the polyisoprenes have a cis content of at least 90%.

The second polymeric component of the mixtures of the invention which are based on the conjugated diene polymer must have a sufficiently high molecular weight, usually reflected by the Mooney viscosity. The Mooney viscosity (ML (1+4) 125°) is preferably higher than 30, and most preferably higher than 35.

The unvulcanized mixtures of rubbery polymers of the invention, optionally combined with additives, must have a tensile strength ranging from between 1.3 and 50 kg/cm$^2$, preferably between 1.4 and 15 kg/cm$^2$.

In order to produce mixtures in accordance with the invention having the aforementioned tensile strength values set forth above, the ethylene copolymer component of the mixtures of the invention must have a certain tensile strength in the unvulcanized state which is referred to as 'Green Strength'. The 'Green Strength' must not be too high, because of the requirements of the characteristics of elongation at ruptures. The mixtures of the invention are characterized by satisfactory tack values, if the tensile strength of the ethylene copolymer employed as a component of the mixture of the invention ranges from between 10 to 100 kg/cm$^2$.

The tensile strength of the rubbery ethylene copolymer component of the mixture of the invention will generally be reduced by admixture with the rubbery copolymer based on the conjugated diene which is selected from the group consisting of styrene-butadiene copolymers, polybutadiene polyisoprene. The tensile strength of the mixture can further be adjusted by employing fillers such as carbon black and oil. Simple variation of the amounts of the fillers will allow determination as to the exact amount which will be necessary to introduce an admixture of the appropriate tensile strength.

The processing temperature, employed to mix the components or form the shaped article will also affect the tensile strength of the mixture. Processing at temperatures of over 100° C., may lower the tensile strength.

When fillers are added to the mixture of the invention, attention must also be given to the elongation at rupture which must be over 800%, preferably over 1200%.

The tensile strength and the elongation at rupture are measured according to NEN 5602 (ring method) at a rate of 10 cm/min. and a temperature of 23° C. The thickness of the test rings was 2 mm.

The mixtures of the invention, including fillers, must have an elongation at rupture of at least 800%, preferably of at least 1200%, especially of at least 1700%.

In order to prepare the mixtures of the invention, the ethylene copolymer component of these mixtures must have per se an elongation at rupture of over 800%, and preferably over 1700%.

Ethylene copolymers which are characterized by such elongation at rupture values can be prepared by methods well known in the art. In undertaking the preparation of these copolymers, it is clear that the ethylene content in the copolymer must be at least 60%, by weight.

If the ethylene copolymer, for instance contains 66 wt % of ethylene and yet is characterized by a low elongation at rupture, the elongation at rupture of that ethylene copolymer may be increased by incorporating more ethylene into that copolymer.

Ethylene copolymers of the invention generally should not contain over 80% by weight of ethylene, since the property of elongation at rupture falls off rapidly at ethylene contents of over 80%, particularly, falls off to even below 800%.

As the elongation at rupture of mixtures of rubbery polymers and fillers usually decreases with increasing filler content, excessive amounts of filler in the mixture should be avoided. However, certain polymer mixtures which do contain considerable amounts of filler retain a high value of elongation at rupture. In general, these mixtures will contain ethylene copolymers of high ethylene contents. (more than 65 weight %). If these copolymers are employed in some instances, it may be that addition of a small amount of filler will raise the elongation at rupture of that mixture.

Although some ethylene copolymers with high ethylene contents exhibit a decrease in elongation at rupture after fillers have been mixed in, if they are processed at lower temperatures, e.g., lower than 100° C. However, this strong decrease can be prevented by raising the processing temperature.

These instructions will enable the expert to determine, by means of some simple experiments, what mixtures are suitable for use according to the present invention.

The mixtures according to the invention contain one or more tackifying resins, the so-called tackifiers. The tackifiers used in the mixtures according to the invention may be any compound that, when added to the mixtures of rubbery polymers, will increase their tack. Substances capable of increasing the tack properties vary in nature. Very suitable compounds are organic cyclic resins containing at least one polar functional group and having a molecular weight of at least 200. Examples of these resins are isoprenoid resins, terpenoid resins, phenol-aldehyde resins, phenolacetylene resins or alkylated phenol resins.

Other examples of suitable tackifiers are terpenes, derivatives of abietic acid, pimaric acid, Diels-Adler reaction products of isoprene with piperylene, butadiene, dicyclopentadiene, or mixtures. Profitable use can be made of alkylated phenol resins, e.g., the resins known by the trade names of 'Amberol S T 140 F', 'Durez 19900', and 'Resin 7521'.

The last-mentioned tackifiers, which are preferably used in the process of the present invention, belong to the group of condensation products of formaldehyde and alkyl phenol with a molecular weight of between 200 and 3000, in particular between 300 and 2000, in which the alkyl group contains 1 to 30, particular 8 to 12, carbon atoms. Preferably, this alkyl group is strongly branched, and contains preferably 8 carbon atoms. Examples of suitable alkyl groups are: 1,1,3,3-tetramethyl butyl, 1,3,5-trimethyl hexyl, and 1,3,5,7-tetramethyl octyl. Also modifications of these resins may be used, e.g., the condensation products of alkyl phenol with $SCl_2$ or $S_2Cl_2$. Mixtures of tackifiers may also be used.

The tackifier may be used in the mixtures according to the invention in amounts ranging between 1 and 25% by weight, based on the polymer mixture, although preferably only small amounts of the tackifier are admixed compared to present practice, e.g., 2 to 10% by weight.

The compositions according to the invention may also contain one or more vulcanizing agents. The vulcanizing agents used in the composition according to the invention may be the conventional vulcanizing agent to be incorporated in the compositions according to the invention may be varied within the wide limits. As a rule, vulcanizers are used in an amount of between 0.5 and 5% by weight, based on the amount of rubbery polymers incorporated in the composition; preferably the amount of vulcanizer ranges between 0.5 and 2% by weight. The mixtures according to the invention may contain, in addition to vulcanizing agents, one or more vulcanization accelerators, such as zinc diethyl carbamate, tetramethyl-thiuram disulphide, 2-mercaptobenzthiazol, and activators, such as diethylene glycol. Furthermore, the rubbery polymers can be vulcanized in the usual way.

The mixtures according to the invention may furthermore contain the usual filters and pigments. Some examples of useful fillers and pigments are carbon black, finely divided silica, precipitated chalk, precipitated aluminum silicate, magnesium silicate, titanium dioxide, and kaolin. As a rule, these substances are added in amounts ranging between 10 and 500, more in particular between 25 and 250% by weight, based on the amount of rubbery polymers incorporated in the compositions.

The mixtures according to the invention may also contain oils. These oils may be naphthenic, paraffinic and aromatic in nature.

As a rule, the oils are incorporated in the mixtures according to the invention in amounts of between 5 and 200% by weight, calculated to the amount of rubbery polymer incorporated in the composition, but, preferably, in amounts of between 10 and 100% by weight.

Although it is necessary to carry out one of the irradiation processes according to U.S. patent application, Ser. No. 517,052, filed Oct. 22, 1974, in order to produce elastomeric mixtures of very high tack values, the process and the product of the present invention is satisfactory for numerous purposes. This process offers the advantage of being much simpler to carry out. Expensive lighting apparatus will not be necessary.

This process will also widen the range of polymers that may be used in tacky mixtures. No requirements of specific unsaturation in the co-polymers are involved in the embodiments of the invention.

It is particularly surprising that these mixtures having definite mechanical properties as regards elongation at rupture and tensile strenght can be made tacky without exposure to light being necessary.

It is also surprising and it is a special advantage of the present invention, that ethene copolymers with a dsc temperature higher than $+11°$ C. can obtain satisfactory tack values when mixed according to the present invention.

The following Examples aim at elucidating the invention, without restricting it in any way.

EXAMPLE I

A mixture was prepared of a copolymer consisting of ethene, propene, and ethylidene norbornene (EPDM) and a styrene-butadiene copolymer (SBR 1500).

Per 100 dl of polymer, the following substances were added to this mixture:
 5 parts of zinc oxide
 1 part of stearic acid
 50 parts of FEF black
 40 parts of aromatic oil
 2 parts of zinc dibutyl dithiocarbamate
 0.5 parts of 2-mercaptobenzthiazol
 0.5 parts of tetramethyl thiuram disulphide
 1.5 parts of sulphur
 5 parts of tackifier resin formed by polycondensation of alkyl phenol and formaldehyde (Amberol S T 140 F).

The tensile strength and the elongation at rupture were determined on both the mixture and the mixture compounded with additives. The compounded mixture was also tested for tack, which was determined by means of a tackmeter designed by DSM and described in SGF Publication No. 235 'News on EPDM and general information of rubber technology'. The method described in this article can be summarized as follows.

Strips of a certain shape are prepared by means of a small piston extruder with an electrically heated cylinder ($100°$ C.).

These strips are carefully covered with aluminum foil, so that no light can act upon them. Then the strip is wound onto a roller previously fitted with adhesive tape with the tacky side facing outwards. Then a second winding is applied around and pressed onto the first winding. To this end, the roller with the wound strips is made to rotate with a constant circumferential speed of about 170 mm/minute, and the strips are pressed upon each other by exerting a constant load of 750 grams by means of a freely revolving roller during one complete revolution of the roller with the strips.

After the strips have been pressed once over the entire circumference of the former roller, the pressure roller is released. Now the second winding is held only by tack. The width of the contact surface between the first and the second winding amounts to 2½ mm. After the second winding has been applied and pressed home, the end of the second winding is fitted to a tensile bench, and the force required to wind off the second rubber strip from the first is measured at room temperature. To prevent stretching of the unvulcanized second rubber strip that is fitted to the tensile bench, the second winding and the past clamped in are provided with adhesive tape. The tacky side of the tape is directed towards the rubber surface.

The wind-off rate is set to 1 cm/minute. The winding-off length over which the tak is measured is about 125 mm.

The result of the measurements are given in Table I below.

TABLE I

| Mixture | I | II | III | IV |
|---|---|---|---|---|
| EPDM* | 100 | 50 | 40 | 0 |
| SBR 1500 | 0 | 50 | 60 | 100 |

TABLE I-continued

| Mixture | | I | II | III | IV |
|---|---|---|---|---|---|
| Polymer Mixture | tensile strength, kg/cm² | 27.5 | >11 | 7 | 1.9 |
| | elongation at rupture, % | 2350 | >2365 | 2160 | 390 |
| Compound | tensile strength, kg/cm² | >2.2 | >2.4 | >2.7 | 1.2 |
| | elongation at rupture, % | >2365 | >2365 | >2365 | 260 |
| Tack value, g/5 mm | | 400 | 3700 | 2200 | 300 |

*The EPDM used (Mooney ML(1 + 4) 125° 59) consisted of 62% by weight of ethene, 28% by weight of propene, and 10% by weight of ethylidene norbornene.

EXAMPLE II

A mixture was prepared of polyisoprene (Natsyn 2200) with a cis-1,4 content of 96% (PIP) and an EPDM with a ML(1 + 4) 120° C. Mooney value of 54, an ethene content of 67% by weight, a propene content of 28% by weight, an ethylidene-norbornene content of 5% by weight and a dsc peak temperature of +12° C.

The mixture was subjected to the same measurements as in Example I, after it had been mixed with additives by the same procedure.

The results of these measurements are mentioned in Table II.

TABLE II

| Mixture | | I | II | III | IV | V |
|---|---|---|---|---|---|---|
| EPDM | | 100 | 90 | 40 | 30 | 0 |
| PIP | | 0 | 10 | 60 | 70 | 100 |
| Polymer Mixture | tensile strength, kg/cm² | 54 | 50.5 | 7.6 | 2.6 | 1.6 |
| | elongation at rupture % | 980 | 980 | 840 | 940 | 200 |
| Compound | tensile strength, kg/cm² | 36 | 51 | 3.9 | 1.5 | 0.6 |
| | elongation at rupture, % | 1950 | 1720 | 1780 | 1420 | 90 |
| Tack value, g/5 mm | | 300 | 80 | 1400 | 2100 | 440 |

EXAMPLE III

An EPDM of the type described in Example I was mixed with a polyisoprene of the type described in Example II.

The mixture was enriched with fillers and additives by the procedure of Example I.

The results of the various measurements are mentioned in Table III.

TABLE III

| Mixture | | I | II | III | IV |
|---|---|---|---|---|---|
| EPDM | | 100 | 40 | 30 | 0 |
| PIP | | 0 | 60 | 70 | 100 |
| Polymer Mixture | tensile strength, kg/cm² | 27.5 | >4.1 | 1.8 | 1.6 |
| | elongation at rupture, % | 2350 | >2365 | 2120 | 200 |
| Compound | tensile strength, kg/cm² | >2.2 | >1.4 | >0.9 | 0.6 |
| | elongation at rupture, % | >2365 | >2365 | >2365 | 90 |
| Tack value, g/5 mm | | 400 | 2800 | 1300 | 440 |

What is claimed is:

1. A tacky rubbery mixture based on a rubbery copolymer of ethylene, at least one other α-alkene, and optionally one or more polyenes, consisting of:
   I. 20 to 75 parts by weight of a rubbery copolymer containing 60 to 80% by weight of ethylene, 20 to 40% by weight of another α-alkene, and 0 to 20% by weight of at least one polyene and having, in the unvulcanized state, an elongation at rupture of over 800% and a tensile strength of between 10 and 100 kg/cm²;
   II. 80 to 25 parts by weight of at least one polymer having a Mooney viscosity (ML (1 + 4) 125°) of at least 30 and composed of a conjugated diene selected from the group consisting of styrene-butadiene copolymers, polybutadiene and polyisoprene; and
   III. a tackifier resin and conventional fillers and additives, said mixture of I, II and III having an elongation at rupture of at least 800% and a tensile strength of between 1.3 and 50 kg/cm².

2. The mixture according to claim 1, wherein the mixture has an elongation at rupture of at least 1200% and a tensile strength of between 1.4 and 15 kg/cm².

3. The mixture according to claim 2, wherein the mixture has an elongation at rupture of at least 1700%.

4. The mixture according to claim 1, wherein the tackifying resin is a compound prepared by reaction of alkyl phenol and formaldehyde and having a molecular weight of between 200 and 3000, in which the alkyl group contains 8 to 12 carbon atoms.

5. The mixture of claim 1, wherein said polyene is a non-conjugated diene.

6. The mixture of claim 5, wherein said α-alkene is propylene.

7. The mixture of claim 6, wherein said polymer composed of a conjugated diene is selected from the group consisting of styrene-butadiene copolymers or polyisoprene.

8. The mixture of claim 7, wherein said polyisoprene has a cis content of at least 90%.

9. The mixture of claim 8, wherein the ethylene content of said rubbery copolymer is below 75% by weight.

10. A process for the preparation of a tacky rubbery mixture based on a rubbery copolymer of ethylene, at least one other α-alkene, and optionally one or more polyenes, wherein said mixture has an elongation at rupture of at least 800% and a tensile strength of between 1.3 and 50 kg/cm² comprising admixing
   I. 20 to 75 parts by weight of a rubbery copolymer containing 60 to 80% by weight of ethylene, 20 to 40% by weight of at least one α-alkene and 0 to 20% by weight of at least one polyene and having, in the unvulcanized state, an elongation at rupture of over 800% in a tensile strength of between 10 and 100 kg/cm² with
   III. 80 to 25 parts by weight of at least one polymer composed of a conjugated diene selected from the group consisting of styrene-butadiene copolymers, polybutadiene and polyisoprene, and
   III. a tackifier resin together with optionally conventional fillers and additives, thereby producing a mixture of the aforementioned requisite elongation at rupture and tensile strength values.

11. The process of claim 10, which consists essentially of admixing I, II and III.

* * * * *